United States Patent Office 2,900,399
Patented Aug. 18, 1959

2,900,399

ANDROSTAN-3,17-DIOL-4-ONE DERIVATIVES

Percy L. Julian, Oak Park, and Helen C. Printy, Chicago, Ill., assignors to The Julian Laboratories, Inc., Franklin Park, Ill., a corporation of Illinois No Drawing. Application July 7, 1958
Serial No. 746,609

12 Claims. (Cl. 260—397.4)

This invention relates to novel androstan-4-one derivatives and to processes for utilizing them. More particularly, this invention relates to androstan-3-ol-4-ones and the process for converting these compounds into the corresponding anabolic 4-hydroxytestosterone congeners.

While the compounds of this invention are particularly important as intermediates in the preparation of anabolically active testosterones, they also have substantial anabolic activity in their own right. The term "anabolic activity" is used to connote tissue building activity at a level which results in a favorable therapeutic ratio to the virilizing or androgenic activity.

These novel androstan-4-one derivatives are represented by the following structural formula:

FORMULA I

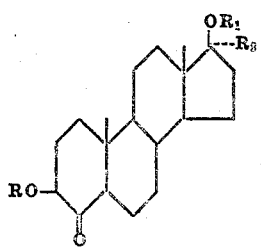

when:

R represents hydrogen or an acyl moiety derived from a hydrocarbon carboxylic acid which preferably contains fewer than 8 carbon atoms, for instance lower alkanoyl of 1 to 7 carbons, benzoyl or hexahydrobenzoyl;

$R_1$ represents hydrogen or an acyl moiety derived from a hydrocarbon carboxylic acid which preferably contains fewer than 8 carbon atoms, for instance lower alkanoyl of 2 to 7 carbons, benzoyl or hexahydrobenzoyl; and $R_2$ represents hydrogen or lower alkyl. The term "lower alkyl" is used to define methyl or ethyl. Preferred and advantageous compounds are represented by Formula I when R and $R_1$ are hydrogen or acetyl and $R_2$ is hydrogen or methyl.

In practice, R and $R_1$ may represent any acyl derivative which possesses anabolic activity as such or upon hydrolysis in vivo to the hydroxylated parent structure. Illustrative of such active compounds are those in which one or both of R and $R_1$ are isobutyryl, cyclopentylpropionyl, phenylacetyl, chloroacetyl, 3,3-dimethylpentanoyl, 4-methylcyclohexanecarboxyl, 4-chlorophenoxyacetyl, 4-tert-butylphenoxyacetyl, palmityl, etc. Such acyl moieties advantageously will have less than 8 carbon atoms.

Many of these esters have prolonged anabolic activity. The acyl moieties must be derived from nontoxic, stable, pharmaceutically acceptable carboxylic acids.

The compounds of this invention are prepared by hydrogenation of the corresponding 2,5-androstadienes of the following structure:

FORMULA II

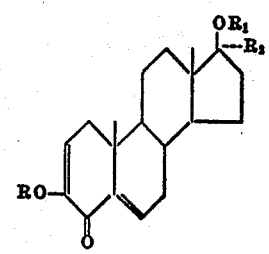

when R and $R_1$ represent an acyl moiety as described hereabove for Formula I, and $R_2$ represents hydrogen or lower alkyl.

The hydrogenation reaction is carried out in a suitable organic solvent unreactive under the reaction conditions described in which the androstadiene starting material is at least partially soluble. Exemplary of such solvents are ethers such as dioxane or ethyl ether, tertiary amines such as pyridine or lutidine, lower esters such as ethyl acetate, aromatic solvents such as toluene or benzene, and lower alcohols such as butanol or isopropanol. Preferably the hydrogenation solvent will be a water miscible alkanol, such as methanol, ethanol, isopropanol or aqueous mixtures thereof. The reaction is run at any convenient temperature, such as from about 20° C. up to the boiling point of the solvent used, such as up to about 75° C. Preferably, temperatures at about room temperature are used, for instance, about 25–30° C. The hydrogenation catalyst is preferably a palladium catalyst, such as palladium-on-calcium carbonate, palladium-on-charcoal, palladium-on-barium sulfate, palladium-silica gel, palladium-kieselguhr and the like. In order to limit the course of the hydrogenation as much as possible to the 2,5-unsaturated positions, the reaction conditions are preferably maintained substantially neutral, and the reaction is interrupted when about 2 molar equivalents of hydrogen are absorbed, usually within one-half to five hours. The reaction product is isolated by removing the spent catalyst and evaporating the solvent.

If the hydrogenation reaction is run under acid conditions, preferably in glacial acetic acid, until about 2.5 molar equivalents of hydrogen are absorbed, the corresponding androstan-4-one of Formula III, in which $R_1$ and $R_2$ are as described above for Formula I, is obtained as the major product:

FORMULA III

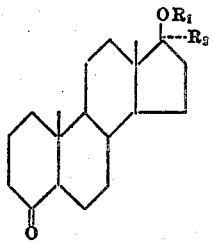

The androstane derivatives of Formula III are useful anabolic agents and intermediates.

The starting material androstadienes of Formula II are prepared by treating the 2,6-dibromotestosterone congeners with an excess of an alkali carboxylate at reflux in a low boiling solvent, thereby causing a rearrangement into the desired 2,5-androstadien-4-one derivative.

The novel compounds of this invention represented by Formula I when R and $R_1$ are hydrogen are obtained from the acylated congeners described above by hydrolysis, preferably using mild alkali, such as an aqueous solution of an alkali metal carbonate or bicarbonate, for instance potassium or sodium bicarbonate, in aqueous organic solvent mixture preferably an aqueous lower alcohol at about room temperature for from one-half to three hours.

The solvent for the hydrolysis is comprised of a mixture of water and a water miscible organic solvent which is not reactive under the hydrolysis conditions employed, such as a lower alcohol, for example methanol or ethanol, dioxane, acetone, dimethylacetamide, dimethylformamide, etc. Alternatively, alkali metal hydroxides such as dilute sodium or potassium hydroxide, or alkali metal alcoholates such as sodium methoxide, or potassium ethoxide can be used. In using the latter alkaline agents, the reaction is complete in from one to three minutes to as long as 15 minutes at room temperature. With mild hydrolysis conditions, such as with carbonates or bicarbonates, the 3-esters are preferentially hydrolyzed before the 17-esters. More vigorous conditions, such as with the hydroxides, remove ester moieties at both positions.

If varied acyl groups are desired for R and $R_1$ in the compounds of Formula I, for instance to prolong the anabolic activity of the compounds, acylation of the 3,7 diols alternatively can be carried out by conventional methods.

The compounds of this invention have unique utility as intermediates in the preparation of the biologically active 4-hydroxytestosterone congeners. The compounds of Formula I in which R and $R_1$ are acyl are hydrolyzed under mild alkaline conditions with alkali metal carbonates and bicarbonates in aqueous alcoholic solution as described above. The resulting 3-ol-4-ones, either crude or after purification, are then oxidized with an excess of bismuth trioxide in acid solution, preferably in glacial acetic acid, by stirring and gentle heating, for instance at about 85° C. to about 120° C. for from about five minutes to three hours. The formation of dark free bismuth during the reaction can be used as a rough guide of the extent of oxidation. The end products are isolated by filtering the reaction mixture to remove the free bismuth. The filtrate is concentrated in vacuo, washed with water and extracted with an immiscible-with-water organic solvent, preferably ether. The organic layer is extracted with alkali solution then concentrated and cooled to give the desired anabolic agent, for instance, 4-hydroxy - 17α - methyltestosterone or 4 - hydroxy - 17α - ethyltestosterone.

Alternatively, the oxidation can be carried out with copper acetate in alcohol or with mild chromic acid conditions, such as chromic oxide in pyridine or chromic acid in acetone at about room temperature. The bismuth oxide oxidation is, however, preferred.

The following examples will serve to illustrate the preparation of the novel compounds as well as variations of the processes of this invention. The scope of this invention is not to be limited by these examples since it will be obvious to one skilled in the art that these examples are merely illustrative of this invention and that modifications thereof are opssible.

*Example 1*

A solution of 3.3 g. (0.01 mole) of testosterone acetate in 110 ml. of anhydrous ether is cooled in an ice bath of 0–2° C. Two drops of 30% HBr in acetic acid are added, followed by a solution of 3.2 g. (0.02 mole) of bromine in 25 ml. of acetic acid, added over a seven minute period. The colorless brominated solution is kept at 0–2° C. for an additional ten minutes, then is concentrated in vacuo with gentle warming to a volume of 20 ml. The voluminous white crystalline precipitate, which is obtained, is filtered, washed with cold ethanol, and dried at room temperature. A first crop of 2,6-dibromotestosterone acetate, M.P. 170–172° C., is obtained.

A suspension of 1.0 g. of the dibromide and 4.0 g. of dry potassium acetate in 40 ml. of distilled acetone is stirred and refluxed for one hour. The reaction mixture is concentrated to a thick slush, water added to dissolve the potassium salts, and the organic material extracted with methylene chloride. The methylene chloride is washed with water and concentrated to a solid, halogen-free crystalline mass. The residue crystallized from ether in glistening prisms gives 3,17β-diacetoxy-2,5-androstadien-4-one, M.P. 173–174° C., $[\alpha]_D^{22}$—11.9° (ethanol).

A solution of 3.42 g. of 3,17β-diacetoxy-2,5-androstadien-4-one in 100 ml. of methanol is shaken with 0.6 g. of 10% palladium-on-charcoal catalyst at 3 atmospheres of hydrogen and room temperature for one hour at which time two molar equivalents of hydrogen are absorbed. The solution is filtered and concentrated to dryness. The residue, mainly 3β,17β-diacetoxyandrostan-4-one, is recrystallized from ether-petroleum ether to give white crystals of the 4-one, M.P. 138–139° C.

*Example 2*

A solution of 3.42 g. of 3-17β-diacetoxy-2,5-androstadien-4-one in 100 ml. of ethanol is hydrogenated at one atmosphere with 1.0 g. of 5% palladium-on-calcium carbonate. The reaction mixture is worked up as in Example 1 to give 3β,17β-diacetoxyandrostan-4-one, M.P. 136–139° C.

*Example 3*

A solution of 6.0 g. of 3β,17β-diacetoxyandrostan-4-one in 75 ml. of methanol is stirred under a stream of nitrogen at 30° C. for two hours with a solution of 2.5 g. of sodium bicarbonate in 25 ml. of water. The reaction mixture is neutralized with acetic acid and poured into water. After extraction with methylene chloride, drying and evaporating the solvent, 17β-acetoxy-3β-hydroxyandrostan-4-one is obtained. This crude product is dissolved in 50 ml. of glacial acetic acid, then heated at 100° C. with 3.5 g. of bismuth trioxide with stirring for 15 minutes. The mixture is filtered and concentrated in vacuo. The residue is washed with water and extracted with ether. After washing the ether extract with alkali, concentration and cooling gives 4-hydroxytestosterone, M.P. 216–218° C.

*Example 4*

A mixture of 2.3 g. of 3-acetoxy-17β-benzoyloxy-2,5-androstadien-4-one and 0.5 g. of 10% palladium-on-charcoal in 100 ml. of methanol is hydrogenated at three atmospheres and room temperature until two molar equivalents of hydrogen are absorbed. The filtered mixture is concentrated in vacuo to give crude 3-acetoxy-17β-benzoyloxy-androstan-4-one.

*Example 5*

A solution of 3.42 g. of 3,17β-diacetoxy-2,5-androstadien-4-one in 100 ml. of glacial acetic acid is shaken with 1.0 g. of 10% palladium-on-charcoal and is hydrogenated at four to five atmospheres until 2.5 molar equivalents of hydrogen are absorbed. After the catalyst is removed, the filtrate is evaporated in vacuo. The residue is taken up in ether which is washed with dilute bicarbonate solution, water and then dried. Low boiling petroleum ether is added to separate 17β-acetoxyandrostan-4-one, M.P. 175–178° C.

*Example 6*

A mixture of 100 mg. of 3,17β-dihydroxyandrostan-4-one (as prepared in Example 3), 0.5 g. of heptanoic anhydride and 1 ml. of anhydrous pyridine is agitated at ambient temperature overnight. The resulting mixture is quenched in ice water, then extracted with ether. The dried ether-extract is concentrated and mixed with petroleum ether to separate 3,17β-diheptanoyloxyandrostan-4-one.

*Example 7*

A solution of 9.5 g. of 3-acetoxy-17α-ethyl-17β-hydroxy-2,5-androstadien-4-one in 400 ml. of methanol with 4.0 g. of palladium-on-charcoal is hydrogenated and worked up as in Example 1 to give 3-acetoxy-17α-ethyl-17β-hydroxyandrostan-4-one.

A portion (3.0 g.) of the crude 4-one is hydrolyzed with potassium bicarbonate solution and then, in turn, oxidized with bismuth trioxide as in Example 3 to give 17α-ethyl-4-hydroxytestosterone.

Example 8

A solution of 18.0 g. of 3-acetoxy-17β-hydroxy-17α-methyl-2,5-androstadien-4-one in 500 ml. of 95% methanol with 6.0 g. of 10% palladium-on-charcoal is hydrogenated at low pressure and room temperature until two molar equivalents of hydrogen are absorbed. The catalyst is removed by filtration and the filtrate concentrated and extracted into methylene chloride. The residue from the organic extracts is in part crystallized from ether to give 3 - acetoxy-17β-hydroxy-17α-methylandrostan-4-one, M.P. 174–176° C.

The remaining crude residue is dissolved in 150 ml. of methanol and hydrolyzed under nitrogen for 90 minutes at 30° C. with a solution of 7.0 g. of potassium bicarbonate in 25 ml. of water.

The reaction mixture is neutralized with acetic acid and poured into water. Extraction with methylene chloride yields crude 3,17β-dihydroxy-17α-methylandrostan-4-one, a portion of which is recrystallized from ether, M.P. 150–155° C.

The crude hydrolysis product is dissolved in 100 ml. of glacial acetic acid. Bismuth trioxide (10.0 g.) is added. The mixture is stirred and heated at 100° C. for 15 minutes. The filtered reaction mixture is concentrated in vacuo, washed with water and extracted with ether. After extraction with alkali, concentration of the ether solution affords 4-hydroxy-17α-methyltestosterone, M.P. 215–218° C., $E_{280}$=9,000.

A mixture of 150 mg. of 4-hydroxy-17α-methyltestosterone, 1 ml. of acetic anhydride and 5 ml. of pyridine is allowed to stand overnight. Quenching in water gives the crude acetate derivative of the compound.

Example 9

A solution of 3.3 g. of 17β-acetoxy-4-formoxy-2,5-androstadien-4-one, M.P. 195–205° C., in 100 ml. of methanol with 0.8 g. of 10% palladium-on-charcoal is hydrogenated until two molar equivalents of hydrogen are absorbed. After working up as in Example 1, 17β-acetoxy-3-formoxyandrostan-4-one is recovered.

Example 10

A mixture of 200 mg. of 3,17β-dihydroxy-17α-methylandrostan-4-one, 0.5 g. of hexahydrobenzoyl chloride and 5 ml. of pyridine is reacted and worked up as in Example 6 to give the hexahydrobenzoate derivative.

In similar fashion, but using 0.5 g. of 3,3-dimethylpentanoyl chloride the 3-dimethylpentanoate derivative of 3,17β-dihydroxy-17α-methylandrostan-4-one is obtained.

What is claimed is:

1. A chemical compound having the structural formula:

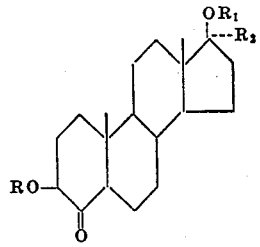

in which R is a member selected from the group consisting of hydrogen and an acyl moiety derived from a nontoxic, stable, pharmaceutically-acceptable carboxylic acid having from 1 to 7 carbon atoms; $R_1$ is a member selected from the group consisting of hydrogen and an acyl moiety derived from a nontoxic, stable, pharmaceutically-acceptable carboxylic acid having from 2 to 7 carbon atoms; and $R_2$ is a member selected from the group consisting of hydrogen, methyl and ethyl.

2. 3β,17β-diacetoxyandrostan-4-one.
3. 3β-acetoxy-17β-hydroxy-17α-methylandrostan-4-one.
4. 3β,17β-dihydroxy-17α-methylandrostan-4-one.
5. 17β-acetoxy-3β-hydroxyandrostan-4-one.
6. 3β,17β-dihyrdroxyandrostan-4-one.
7. The method of forming a compound having the structural formula:

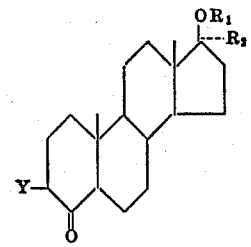

in which Y is a member selected from the group consisting of hydrogen and —OR in which R is an acyl moiety derived from a nontoxic, stable, pharmaceutically-acceptable carboxylic acid having from 1 to 7 carbon atoms; $R_1$ is a member selected from the group consisting of hydrogen and an acyl moiety derived from a nontoxic, stable, pharmaceutically-acceptable carboxylic acid having from 2 to 7 carbon atoms; and $R_2$ is a member selected from the group consisting of hydrogen, methyl and ethyl, which comprises hydrogenating with about two molar equivalents of hydrogen in the presence of a palladium catalyst over a period of one-half to five hours a compound having the structural formula:

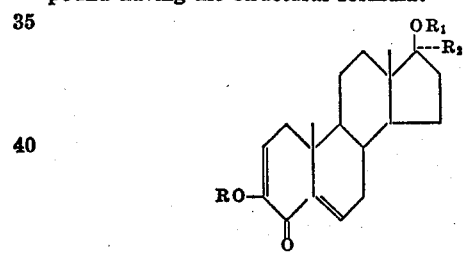

in which R is an acyl moiety derived from a nontoxic, stable, pharmaceutically-acceptable carboxylic acid having from 1 to 7 carbon atoms; $R_1$ is a member selected from the group consisting of hydrogen and an acyl moiety derived from a nontoxic, stable, pharmaceutically-acceptable carboxylic acid having from 2 to 7 carbon atoms; and $R_2$ is a member selected from the group consisting of hydrogen, methyl and ethyl.

8. The method of claim 7 characterized in that Y is —OR in which R is an acyl moiety derived from a nontoxic, stable, pharmaceutically-acceptable carboxylic acid having from 1 to 7 carbon atoms and the hydrogenation is carried out under substantially neutral conditions.

9. The method of claim 7 characterized in that Y is acetoxy; R is acetyl; $R_1$ is hydrogen and $R_2$ is methyl.

10. The method of claim 7 characterized in that Y is acetoxy; R is acetyl; $R_1$ is hydrogen and $R_2$ is ethyl.

11. The method of forming a compound having the structural formula:

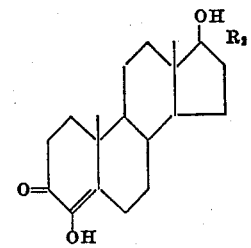

in which $R_2$ is a member selected from the group consist ing of hydrogen, methyl and ethyl, comprising hydrolyzing with alkaline hydrolyzing agents a compound having the structural formula:

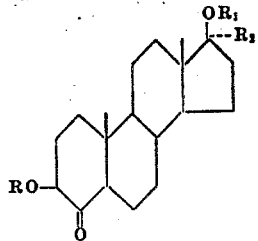

in which R is an acyl moiety derived from a hydrocarbon carboxylic acid having from 1 to 7 carbon atoms; $R_1$ is a member selected from the group consisting of hydrogen and an acyl moiety derived from a nontoxic, stable, pharmaceutically-acceptable carboxylic acid having from 2 to 7 carbon atoms; and $R_2$ is a member selected from the group consisting of hydrogen, methyl and ethyl to form the corresponding 3,17-diol, and oxidizing the 3,17-diol product in acid solution at about 85° to about 120° C. with bismuth trioxide.

12. The method of claim 11 characterized in that R is acetyl; $R_1$ is hydrogen and $R_2$ is methyl.

References Cited in the file of this patent
UNITED STATES PATENTS

| | | |
|---|---|---|
| 2,374,370 | Miescher et al. | Apr. 24, 1945 |
| 2,762,818 | Levy et al. | Sept. 11, 1956 |

OTHER REFERENCES

Camerino et al.: J. Am. Chem. Soc., vol. 78 (July 20, 1956), pages 3540 and 3541.